United States Patent
Lorenz et al.

(10) Patent No.: US 8,501,904 B2
(45) Date of Patent: Aug. 6, 2013

(54) METHOD FOR PRODUCING POLYOLS

(75) Inventors: Klaus Lorenz, Dormagen (DE); Arnulf Werner, Dormagen (DE); Marcus Eichmann, Düsseldorf (DE)

(73) Assignee: Bayer MaterialScience AG (DE)

( * ) Notice: Subject to any disclaimer, the term of this patent is extended or adjusted under 35 U.S.C. 154(b) by 163 days.

(21) Appl. No.: 12/999,362

(22) PCT Filed: Apr. 6, 2009

(86) PCT No.: PCT/EP2009/003981
§ 371 (c)(1),
(2), (4) Date: Dec. 21, 2010

(87) PCT Pub. No.: WO2009/152954
PCT Pub. Date: Dec. 23, 2009

(65) Prior Publication Data
US 2011/0105714 A1  May 5, 2011

(30) Foreign Application Priority Data
Jun. 16, 2008 (DE) .......................... 10 2008 028 555

(51) Int. Cl.
*C08G 59/14* (2006.01)
*C08G 59/18* (2006.01)
*C08G 59/20* (2006.01)
*C08G 59/00* (2006.01)
*C08G 65/00* (2006.01)

(52) U.S. Cl.
USPC ........... 528/405; 528/425; 528/486; 528/488; 528/489; 528/492; 528/502 R

(58) Field of Classification Search
USPC ............. 528/425, 486, 488, 489, 492, 502 R, 528/405
See application file for complete search history.

(56) References Cited

U.S. PATENT DOCUMENTS

| | | |
|---|---|---|
| 3,823,145 A | 7/1974 | Louvar et al. |
| 4,110,268 A | 8/1978 | Longley et al. |
| 4,521,548 A | 6/1985 | Christen et al. |
| 5,470,813 A | 11/1995 | Le-Khac |
| 6,762,221 B1 | 7/2004 | Pakusch et al. |
| 6,827,858 B2 | 12/2004 | Bader et al. |
| 7,008,900 B1 | 3/2006 | Hofmann et al. |
| 2004/0167316 A1 | 8/2004 | Anderson et al. |
| 2009/0048420 A1 | 2/2009 | Lorenz et al. |

FOREIGN PATENT DOCUMENTS

| | | |
|---|---|---|
| CN | 101033285 A | 9/2007 |
| DE | 10024313 A1 | 11/2001 |
| EP | 050181 A1 | 4/1982 |
| EP | 0700949 A2 | 3/1996 |
| EP | 0743093 A1 | 11/1996 |
| EP | 0761708 A2 | 3/1997 |
| EP | 2028211 A1 | 2/2009 |
| JP | 6-157743 A | 6/1994 |
| JP | 10-030023 A | 2/1998 |
| WO | WO-96/20972 A2 | 7/1996 |
| WO | WO-97/40086 A1 | 10/1997 |
| WO | WO-98/16310 A1 | 4/1998 |
| WO | WO-98/20061 A1 | 5/1998 |
| WO | WO-00/47649 A1 | 8/2000 |
| WO | WO-01/14456 A1 | 3/2001 |
| WO | WO-2004/076529 A1 | 9/2004 |
| WO | WO-2004/083276 A1 | 9/2004 |

OTHER PUBLICATIONS

Ionescu, Mihail, et al., *New Synthetic Pathways to Polyether Polyols for Rigid Polyurethane Foams* (2002, pp. 151-218, Institute of Chemical Research, Splaiul Independentei 202, 77208, Sectfion 6, Bucharest, Romania.

*Primary Examiner* — Duc Truong
(74) *Attorney, Agent, or Firm* — Novak Druce Connolly Bove + Quigg LLP

(57) ABSTRACT

A process for the preparation of a polyol which includes reacting an amino-group-containing starter compound with an alkylene oxide in the presence of a catalyst to form a polyol, wherein the catalyst is based on a compound selected from the group consisting of alkali metal hydroxides, alkali, alkaline earth metal hydrides, alkaline earth metal carboxylates, and alkaline earth hydroxides, and wherein the catalyst is present in an amount of from 0.004 to 0.1 wt. % based on the amount of polyol; and neutralizing the polyol with from 0.75 to 1 mol of sulfuric acid per mol of catalyst used.

15 Claims, No Drawings

METHOD FOR PRODUCING POLYOLS

CROSS-REFERENCE TO RELATED APPLICATIONS

This application is a national stage application (under 35 U.S.C. §371) of PCT/EP2009/003981, filed Jun. 4, 2009, which claims benefit of German Application No. 10 2008 028 555.2, filed Jun. 16, 2008.

BACKGROUND OF THE INVENTION

The present invention provides polyols that are obtainable by a simple process. The invention further provides the process itself and also the use of the polyols according to the invention in the production of polyurethane materials.

Polyols suitable for the production of polyurethane materials such as flexible or rigid foams or solid materials such as elastomers are generally obtained by polymerisation of suitable alkylene oxides on polyfunctional starter compounds, that is to say starter compounds containing a plurality of Zerewitinoff-active hydrogen atoms. A very wide variety of processes has long been known for carrying out such polymerisation reactions, some of which processes complement one another:

On the one hand, the base-catalysed addition of alkylene oxides to starter compounds having Zerewitinoff-active hydrogen atoms is important on a large scale; on the other hand, the use of double metal cyanide compounds ("DMC catalysts") for carrying out this reaction is becoming increasingly important. With the use of highly active DMC catalysts, which are described, for example, in U.S. Pat. No. 5,470,813, EP-A 700 949, EP-A 743 093, EP-A 761 708, WO 97/40086, WO 98/16310 and WO 00/47649, it is possible to prepare polyether polyols with very low catalyst concentrations (25 ppm or less), so that it is no longer necessary to separate the catalyst from the finished product. However, such catalysts are not suitable for the preparation of short-chained polyols or of polyols based on amino-group-containing starters. The basic catalysts which have long been known, for example those based on alkali metal hydroxides, permit the problem-free preparation of short-chained polyols and/or of polyols based on amino-group-containing starters, but the catalyst must generally be removed from the crude alkaline polymer by means of a separate working-up step. In the case of the preparation of amino-group-containing polyols in particular, yellow to yellowish-brown coloured products are frequently obtained; coloured starting materials are undesirable for certain applications, for example in the case of lacquers and coatings. The (Lewis) acid-catalysed addition of alkylene oxides to suitable starter compounds is of lesser importance.

The base-catalysed addition of alkylene oxides, such as, for example, ethylene oxide or propylene oxide, to starter compounds having Zerewitinoff-active hydrogen atoms is carried out, as has already been mentioned, in the presence of alkali metal hydroxides, but alkali metal hydrides, alkali metal carboxylates, alkaline earth hydroxides or amines such as, for example, N,N-dimethylbenzylamine or imidazole or imidazole derivatives can also be used. In the case of amino-group-containing starters having Zerewitinoff-active hydrogen atoms bonded to nitrogen atoms, up to one mol of alkylene oxides can be added per mol of Zerewitinoff-active hydrogen atoms without catalysis; if that ratio is exceeded; one of the above-mentioned basic catalysts must generally be added. When the alkylene oxides have been added, the polymerisation-active centres on the polyether chains must be deactivated. Various procedures are possible therefor. For example, neutralisation can be effected with dilute mineral acids such as sulfuric acid or phosphoric acid. The strength of the second dissociation stage of sulfuric acid is sufficient for the protonation of the alkali metal hydroxides formed by hydrolysis of the active alcoholate groups, so that 2 mol of alcoholate groups can be neutralised per mol of sulfuric acid used. Phosphoric acid, on the other hand, must be used in an equimolar amount relative to the amount of alcoholate groups to be neutralised. The salts formed in the neutralisation and/or during the removal of the water by distillation must generally be separated off by means of filtration processes. Distillation and filtration processes are time- and energy-intensive and, in addition, are not readily reproducible in many cases. Many processes have therefore been developed which can be carried out without a filtration step and, in many cases, also without a distillation step: Neutralisation with hydroxycarboxylic acids such as, for example, lactic acid is described in WO 98/20061 and US-A 2004167316 for the working-up of short-chained polyols for rigid foam applications; these are widely used and well established processes. U.S. Pat. No. 4,521,548 describes how the polymerisation-active centres can be deactivated in a similar manner by reaction with formic acid. The metal carboxylates formed after neutralisation with hydroxycarboxylic acids or formic acid dissolve to give a clear solution in the polyether polyols. However, a disadvantage of these processes is the catalytic activity of the salts that remain in the products, which is undesirable for many polyurethane applications. In WO 04/076529, the polymerisation reactions are therefore carried out with low catalyst concentrations of from 10 to 1000 ppm KOH, so that the catalytically active hydroxycarboxylic acid salts that remain in the polyol after the neutralisation are likewise present in a low concentration and accordingly are less disruptive for subsequent reactions. In JP-A 10-30023 and U.S. Pat. No. 4,110,268, aromatic sulfonic acids or organic sulfonic acids are used for the neutralisation; those acids likewise form salts which are soluble in the polyether polyols but are less basic and are distinguished by low catalytic activity. A critical disadvantage here is the high cost of the sulfonic acids. Working-up by means of acidic cation exchangers, as is described in DE-A 100 24 313, requires the use of solvents and their removal by distillation and is accordingly also associated with high costs. Phase separation processes require only a hydrolysis step and not a neutralisation step and are described, for example, in WO 01/14456, JP-A 6-157743, WO 96/20972 and U.S. Pat. No. 3,823,145. The phase separation of the polyether polyols from the alkaline aqueous phase is assisted by the use of coalescers or centrifuges; it is often necessary to add solvents here too in order to increase the density difference between the polyether phase and the aqueous phase. Such processes are not suitable for all polyether polyols; in particular, they are not successful in the case of short-chained polyether polyols or polyether polyols having high ethylene oxide contents. The use of solvents is cost-intensive, and centrifuges require a high outlay in terms of maintenance.

In the case of amine-catalysed alkylene oxide addition reactions, further working-up can be omitted provided that the presence of the amines in the polyols does not interfere with the production of polyurethane materials. Only polyols having comparatively low equivalent weights can be obtained by amine catalysis; see in this connection, for example, Ionescu et al. in "Advances in Urethane Science & Technology", 1998, 14, p. 151-218.

BRIEF DESCRIPTION OF THE INVENTION

The object of the present invention was, therefore, to find an inexpensive working-up process for amino-group-containing polyols, including ethylene-oxide-containing amino-group-containing polyols, prepared with alkali or alkaline earth hydroxide, carboxylate or hydride catalysis, which process does not have the disadvantages of the processes of the prior art. It was a particular object of the invention to obtain amino-group-containing polyols having a low inherent colour.

It has been possible to achieve the object by effecting the neutralisation of the alkaline, polymerisation-active centres of the crude alkylene oxide addition product by addition of from 0.75 to 1 mol of sulfuric acid per mol of catalyst. This procedure yields clear products which surprisingly exhibit a lower inherent colour than do products neutralised with less than 0.75 mol of sulfuric acid per mol of catalyst. The method can be used for long- and short-chained polyether polyols, that is to say the OH number range of the end products extends from approximately 20 mg KOH/g to approximately 1000 mg KOH/g. The structure of the polyether chains, that is to say the composition of the alkylene oxides or of the alkylene oxide mixture used in the preparation of the polyols, can likewise be varied.

DETAILED DESCRIPTION OF THE INVENTION

In detail, the process according to the invention is carried out as follows:

The starter compounds are usually placed in the reactor, and the catalyst, that is to say the alkali metal hydroxide, alkali, alkaline earth metal hydride, alkali, alkaline earth metal carboxylate or alkaline earth hydroxide, is optionally added at that stage. Preference is given to the use of alkali metal hydroxides, particularly preferably potassium hydroxide. The catalyst can be fed to the starter compound(s) in the form of an aqueous solution or in solid form. The catalyst concentration, based on the amount of end product, is from 0.004 to 0.1 wt. %, preferably from 0.01 to 0.1 wt. %, particularly preferably from 0.025 to 0.1 wt. %. The solvent water and/or the water freed in the reaction of the starter compounds with the catalyst can be removed in vacuo at elevated temperature, preferably at the reaction temperature, before the metered addition of the alkylene oxide(s) is started, provided that the starter compounds used have a sufficiently low vapour pressure. Alternatively, alkylene oxide can first be added without catalyst and the addition of the alkali metal hydroxide and the dewatering step can be carried out only when a sufficiently low vapour pressure of the starter species has been achieved. In the case of low catalyst concentrations, it is also possible for the dewatering step to be omitted.

There can also be used as basic catalysts ready-made alkylene oxide addition products of starter compounds containing Zerewitinoff-active hydrogen atoms having alkoxylate contents of from 0.05 to 50 equivalent-% ("polymeric alkoxylates"). The alkoxylate content of the catalyst is to be understood as meaning the proportion of Zerewitinoff-active hydrogen atoms that is removed by a base by deprotonation, based on all the Zerewitinoff-active hydrogen atoms originally present in the alkylene oxide addition product of the catalyst. The amount of polymeric alkoxylate used is, of course, dependent on the desired catalyst concentration for the amount of end product, as described in the preceding paragraph.

Hydrogen bonded to N, O or S is referred to as Zerewitinoff-active hydrogen (sometimes also only as "active hydrogen") when it yields methane by reaction with methylmagnesium iodide according to a process discovered by Zerewitinoff. Typical examples of compounds having Zerewitinoff-active hydrogen are compounds that contain carboxyl, hydroxyl, amino, imino or thiol groups as functional groups.

The starter compounds placed in the reactor are then reacted with alkylene oxides under an inert gas atmosphere at temperatures of from 80 to 180° C., preferably from 100 to 170° C., the alkylene oxides being fed continuously to the reactor in the conventional manner so that the safety-related pressure limits of the reactor system used are not exceeded. Such reactions are conventionally carried out in the pressure range from 10 mbar to 10 bar. If, as already mentioned above, the alkylene oxide(s) is/are first to be added without catalyst, the metered alkylene oxide addition is to be interrupted at a suitable point and the catalyst added after an appropriate after-reaction time has passed. The end of the alkylene oxide addition phase is followed by an after-reaction phase in which residual alkylene oxide reacts completely. The end of the after-reaction phase is reached when no further pressure drop can be detected in the reaction vessel. Neutralisation of the alkaline, polymerisation-active centres of the crude alkylene oxide addition product is then carried out by addition of from 0.75 to 1 mol of sulfuric acid per mol of catalyst, preferably from 0.8 to 1 mol of sulfuric acid per mol of catalyst, particularly preferably from 0.9 to 1 mol of sulfuric acid per mol of catalyst, most particularly preferably from 0.95 to 1 mol of sulfuric acid per mol of catalyst. The temperature can be varied within wide limits in the neutralisation; limits can be set by the polyol structure. If hydrolytically sensitive groups, such as, for example, ester groups, are present in the products, the neutralisation can be carried out at room temperature, for example. When the neutralisation has taken place, traces of water introduced by the addition of the dilute acid can be removed in vacuo. Anti-ageing agents or antioxidants can be added to the products during or after the neutralisation. Further working-up steps, such as, for example, filtration of the product, are not normally necessary. However, the resulting salts can also be separated off, if required. Crystallisation of the salts can be promoted by the addition of water in amounts of from 2 wt. % to 20 wt. %, based on the mass of the alkaline polymerisation product, before or during the neutralisation and the subsequent removal thereof by distillation. The salts so crystallised out can be separated off by filtration.

Suitable amino-group-containing starter compounds mostly have functionalities of from 1 to 4, the functionality being understood as meaning the number of Zerewitinoff-active hydrogen atoms present per starter molecule. The amino-group-containing starter compounds preferably contain at least one primary amino group ($-NH_2$) and/or secondary amino group and/or tertiary amino group. Their molar masses are from 17 g/mol to approximately 1200 g/mol.

Examples of amino-group-containing starter compounds are ammonia, ethanolamine, diethanolamine, triethanolamine, isopropanolamine, diisopropanolamine, ethylenediamine, hexamethylenediamine, aniline, the isomers of toluidine, the isomers of diaminotoluene, the isomers of diaminodiphenylmethane, and higher nuclear products formed in the condensation of aniline with formaldehyde to give diaminodiphenylmethane. Of course, it is also possible to use mixtures of different amino-group-containing starter compounds. Furthermore, mixtures of amino-group-containing starters and amino-group-free starters can also be used. The content of amino-group-containing starters in the starter mixture should be at least 20 mol %. Examples of amino-group-free starters are methanol, ethanol, 1-propanol, 2-propanol and higher aliphatic monools, in particular fatty alcohols, phenol, alkyl-substituted phenols, propylene glycol, ethylene glycol, diethylene glycol, dipropylene glycol, 1,2- butanediol, 1,3-butanediol, 1,4-butanediol, hexanediol, pentanediol, 3-methyl-1,5-pentanediol, 1,12-dodecanediol, glycerol, trimethylolpropane, pentaerythritol, sorbitol, saccharose, hydroquinone, pyrocatechol, resorcinol, bisphenol F, bisphenol A, 1,3,5-trihydroxybenzene or methylol-group-containing condensation products of formaldehyde and phenol. In addition, melamine or urea as well as Mannich bases can act as (co)starters.

Furthermore, it is also possible to add to the process ready-made alkylene oxide addition products of the mentioned amino-group-containing or amino-group-free starter compounds, that is to say polyether polyols having OH numbers of from 20 to 1000 mg KOH/g, preferably from 250 to 1000 mg KOH/g. It is also possible to use in the process according to the invention, in addition to the starter compounds, also polyester polyols having OH numbers in the range from 6 to 800 mg KOH/g, with the aim of preparing polyether esters. Polyester polyols suitable therefor can be prepared, for example, from organic dicarboxylic acids having from 2 to 12 carbon atoms and polyhydric alcohols, preferably diols, having from 2 to 12 carbon atoms, preferably from 2 to 6 carbon atoms, by known processes.

Against the background of the shortage of petrochemical resources and the unfavourable assessment of fossil raw materials in ecological balances, the use of raw materials from renewable sources is increasingly gaining importance also in the preparation of polyols suitable for the polyurethane industry. The process according to the invention opens up a highly economical possibility for the preparation of such polyols by adding to the process, before or during the addition of the alkylene oxides, triglycerides such as, for example, soya oil, rapeseed oil, palm kernel oil, palm oil, linseed oil, sunflower oil, herring oil, sardine oil, lesquerella oil and castor oil in amounts of from 10 to 80 wt. %, based on the amount of end product. There are obtained polyether ester polyols into whose structure the oils have been completely incorporated so that they are no longer detectable, or are detectable in only very small amounts, in the end product. Surprisingly, oils without hydroxy groups also yield homogeneous end products in this process variant.

The mentioned polymeric alkoxylates which can be used as catalyst are prepared in a separate reaction step by alkylene oxide addition to starter compounds containing Zerewitinoff-active hydrogen atoms. Conventionally, in the preparation of the polymeric alkoxylate, an alkali or alkaline earth metal hydroxide, for example KOH, in amounts of from 0.1 to 1 wt. %, based on the amount to be prepared, is used as catalyst, the reaction mixture is dewatered in vacuo, if necessary, the alkylene oxide addition reaction is carried out under an inert gas atmosphere at from 100 to 170° C. until an OH number of from 150 to 1200 mg KOH/g is achieved, and the whole is then optionally adjusted to the above-mentioned alkoxylate contents of from 0.05 to 50 equivalent % by addition of further alkali or alkaline earth metal hydroxide and subsequent dewatering. Polymeric alkoxylates so prepared can be stored separately under an inert gas atmosphere. They are used in the process according to the invention particularly preferably when materials that are sensitive to hydrolysis under alkaline conditions are used or when the amount of low molecular weight starters in the preparation of long-chained polyols is not sufficient to ensure adequately thorough mixing of the reaction mixture at the start of the reaction. Furthermore, some low molecular weight starters have a tendency to form sparingly soluble alkali or alkaline earth metal salts; in such cases, it is likewise recommended first to convert the starter into a polymeric alkoxylate by the above-described process. The amount of polymeric alkoxylate used in the process according to the invention is usually such that it corresponds to an alkali or alkaline earth metal hydroxide concentration, based on the amount of end product according to the invention that is to be prepared, of from 0.004 to 0.1 wt. %, preferably from 0.01 to 0.1 wt. %, particularly preferably from 0.025 to 0.1 wt. %. The polymeric alkoxylates can, of course, also be used in the form of mixtures.

Suitable alkylene oxides are, for example, ethylene oxide, propylene oxide, 1,2-butylene oxide or 2,3-butylene oxide and styrene oxide. Preference is given to the use of propylene oxide and ethylene oxide. The various alkylene oxides can be added in the form of a mixture or in blocks. Products containing ethylene oxide end blocks are characterised, for example, by increased concentrations of primary end groups, which confer on the systems the necessary isocyanate reactivity for moulding foam applications.

The crude alkaline polyols generally have OH numbers of from 20 to 1000 mg KOH/g, preferably OH numbers of from 28 to 700 mg KOH/g.

The polyols obtainable by the process according to the invention can be used as starting components for the production of solid or foamed polyurethane materials and of polyurethane elastomers. The polyurethane materials and elastomers can also contain isocyanurate, allophanate and biuret structural units. Also possible is the preparation of so-called isocyanate prepolymers, in whose preparation a molar ratio of isocyanate groups to hydroxy groups of greater than 1 is used, so that the product contains free isocyanate functionalities. These are not reacted until the preparation of the actual end product in one or more steps.

For the production of these materials, the polyols according to the invention are optionally mixed with further isocyanate-reactive components and reacted with organic polyisocyanates, optionally in the presence of foaming agents, in the presence of catalysts, optionally in the presence of other additives, such as, for example, cell stabilisers.

EXAMPLES

Raw Materials Used

Irganox® 1076: Octadecyl 3-(3,5-di-tert-butyl-4-hydroxyphenyl)propionate

Example 1

1046.1 g of ethylenediamine were introduced, under a nitrogen atmosphere, into a 10-liter laboratory autoclave. After closing the filling nozzle, residual oxygen was removed by applying a nitrogen pressure of 3 bar three times and then letting off the excess pressure to atmospheric pressure. Heating to 150° C. was carried out, with stirring (450 rpm), and 3711.5 g of propylene oxide were metered into the autoclave over a period of 3 hours. The mixture was then allowed to react for one hour and subsequently cooled to 80° C. After addition of 2.815 g of a 44.82 wt. % aqueous solution of KOH, the water was removed in vacuo (20 mbar) over a period of one hour at 150° C. by stripping with nitrogen (50 ml/min). 1244.2 g of propylene oxide were then metered in over a period of 2.5 hours. There followed an after-reaction time of 1.5 hours. After a heating time of 30 minutes in vacuo and cooling to room temperature, two fractions were removed from the batch for neutralisation tests (Examples 1A and 1B). The catalyst concentration (KOH) was 210 ppm.

Example 1A (Comparison)

2.028 g of 11.82% sulfuric acid, corresponding to 0.50 mol of sulfuric acid per mol of KOH, were added at 80° C. to 1305.2 g of the product from Example 1, and stirring was carried out for one hour at 80° C. After addition of 0.88 g of Irganox® 1076, the product was dewatered for one hour at 18 mbar (water-jet vacuum) and then for 3 hours at 110° C. and 1 mbar. A clear product was obtained.

Example 1B 4.064 g of 11.82% sulfuric acid, corresponding to 1.00 mol of sulfuric acid per mol of KOH, were added at 80° C. to 1307.6 g of the product from Example 1, and stirring was carried out for one hour at 80° C. After addition of 0.885 g of Irganox® 1076, the product was dewatered for one hour at 18 mbar (water-jet vacuum) and then for 3 hours at 110° C. and 1 mbar. A clear product was obtained.

Example 2

1049 g of ethylenediamine were introduced, under a nitrogen atmosphere, into a 10-liter laboratory autoclave. After closing the filling nozzle, residual oxygen was removed by applying a nitrogen pressure of 3 bar three times and then letting off the excess pressure to atmospheric pressure. Heating to 150° C. was carried out, with stirring (450 rpm), and 3735 g of propylene oxide were metered into the autoclave over a period of 3 hours. The mixture was then allowed to react for one hour and subsequently cooled to 80° C. After addition of 6.922 g of a 44.82 wt. % aqueous solution of KOH, the water was removed in vacuo (20 mbar) over a period of one hour at 150° C. by stripping with nitrogen (50 ml/min). 1252.2 g of propylene oxide were then metered in over a period of one hour. There followed an after-reaction time of 1.5 hours. After a heating time of 30 minutes in vacuo and cooling to room temperature, two fractions were removed from the batch for neutralisation tests (Examples 1A and 1B). The catalyst concentration (KOH) was 510 ppm. (Examples 2A, 2B, 2C, 2D and 2E)

Example 2A (Comparison)

4.509 g of 11.82% sulfuric acid, corresponding to 0.51 mol of sulfuric acid per mol of KOH, were added at 80° C. to 1183.5 g of the product from Example 2, and stirring was carried out for one hour at 80° C. After addition of 0.792 g of Irganox® 1076, the product was dewatered for one hour at 18 mbar (water-jet vacuum) and then for 3 hours at 110° C. and 1 mbar. A clear product was obtained.

Example 2B 8.971 g of 11.82% sulfuric acid, corresponding to 1.00 mol of sulfuric acid per mol of KOH, were added at 80° C. to 1179.3 g of the product from Example 2, and stirring was carried out for one hour at 80° C. After addition of 0.799 g of Irganox® 1076, the product was dewatered for one hour at 18 mbar (water-jet vacuum) and then for 3 hours at 110° C. and 1 mbar. A clear product was obtained.

Example 2C (Comparison)

1.238 g of 85% phosphoric acid, corresponding to 0.99 mol of phosphoric acid per mol of KOH, were added at 80° C. to 1192.8 g of the product from Example 2, and stirring was carried out for one hour at 80° C. After addition of 0.814 g of Irganox® 1076, the product was dewatered for one hour at 18 mbar (water-jet vacuum) and then for 3 hours at 110° C. and 1 mbar. A cloudy product was obtained.

Example 2D (Comparison)

110 ml of distilled water and 4.426 g of 11.87% sulfuric acid, corresponding to 0.50 mol of sulfuric acid per mol of KOH, were added at 80° C. to 1189.7 g of the product from Example 2, and stirring was carried out for one hour at 80° C. After addition of 0.797 g of Irganox® 1076, the product was dewatered for one hour at 18 mbar (water-jet vacuum) and then for 3 hours at 110° C. and 1 mbar. After filtration over a laboratory suction filter equipped with a T 750 deep-bed filter from Pall, a clear product was obtained.

Example 2E 106 ml of distilled water and 8.819 g of 11.87% sulfuric acid, corresponding to 0.99 mol of sulfuric acid per mol of KOH, were added at 80° C. to 1182.4 g of the product from Example 2, and stirring was carried out for one hour at 80° C. After addition of 0.790 g of Irganox® 1076, the product was dewatered for one hour at 18 mbar (water-jet vacuum) and then for 3 hours at 110° C. and 1 mbar. After filtration over a laboratory suction filter equipped with a T 750 deep-bed filter from Pall, a clear product was obtained.

Example 3

1025.2 g of ethylenediamine were introduced, under a nitrogen atmosphere, into a 10-liter laboratory autoclave. After closing the filling nozzle, residual oxygen was removed by applying a nitrogen pressure of 3 bar three times and then letting off the excess pressure to atmospheric pressure. Heating to 150° C. was carried out, with stirring (450 rpm), and 3725.7 g of propylene oxide were metered into the autoclave over a period of 3 hours. The mixture was then allowed to react for one hour and subsequently cooled to 80° C. After addition of 13.668 g of a 44.82 wt. % aqueous solution of KOH, the water was removed in vacuo (20 mbar) over a period of one hour at 150° C. by stripping with nitrogen (50 ml/min). 1249.1 g of propylene oxide were then metered in over a period of one hour. There followed an after-reaction time of 1.5 hours. The alkaline crude product was then heated for a further 30 minutes at 150° C. in vacuo. The catalyst concentration (KOH) was 1020 ppm.

Example 3A (Comparison)

9.969 g of 11.87% sulfuric acid, corresponding to 0.50 mol of sulfuric acid per mol of KOH, were added at 80° C. to 1327.4 g of the product from Example 3, and stirring was carried out for one hour at 80° C. After addition of 0.891 g of Irganox® 1076, the product was dewatered for one hour at 18 mbar (water-jet vacuum) and then for 3 hours at 110° C. and 1 mbar. A clear product was obtained.

Example 3B 19.532 g of 11.87% sulfuric acid, corresponding to 1.00 mol of sulfuric acid per mol of KOH, were added at 80° C. to 1299.8 g of the product from Example 3, and stirring was carried out for one hour at 80° C. After addition of 0.891 g of Irganox® 1076, the product was dewatered for one hour at 18 mbar (water-jet vacuum) and then for 3 hours at 110° C. and 1 mbar. A clear product was obtained.

Example 4

756.8 g of ethylenediamine were introduced, under a nitrogen atmosphere, into a 10-liter laboratory autoclave. After closing the filling nozzle, residual oxygen was removed by applying a nitrogen pressure of 3 bar three times and then letting off the excess pressure to atmospheric pressure. Heating to 150° C. was carried out, with stirring (450 rpm), and 2769.8 g of propylene oxide were metered into the autoclave over a period of 3 hours. The mixture was then allowed to react for one hour and subsequently cooled to 80° C. After addition of 6.967 g of a 44.83 wt. % aqueous solution of KOH, the water was removed in vacuo (20 mbar) over a period of one hour at 150° C. by stripping with nitrogen (50 ml/min). 2476.4 g of propylene oxide were then metered in over a period of one hour. There followed an after-reaction time of 2 hours. The alkaline crude product was then heated for a further 30 minutes at 150° C. in vacuo. The catalyst concentration (KOH) was 520 ppm.

Example 4A (Comparison)

1.4325 g of 85% phosphoric acid, corresponding to 0.99 mol of phosphoric acid per mol of KOH, were added at 80° C. to 1347.8 g of the product from Example 4, and stirring was carried out for one hour at 80° C. After addition of 0.911 g of Irganox® 1076, the product was dewatered for one hour at 18 mbar (water-jet vacuum) and then for 3 hours at 110° C. and 1 mbar. A cloudy product was obtained.

Example 4B (Comparison)

118 ml of distilled water and 4.934 g of 11.87% sulfuric acid, corresponding to 0.49 mol of sulfuric acid per mol of KOH, were added at 80° C. to 1303.8 g of the product from Example 4, and stirring was carried out for one hour at 80° C. After addition of 0.881 g of Irganox® 1076, the product was dewatered for one hour at 18 mbar (water-jet vacuum) and then for 3 hours at 110° C. and 1 mbar. After filtration over a laboratory suction filter equipped with a T 750 deep-bed filter from Pall, a clear product was obtained.

Example 4C 118 ml of distilled water and 9.892 g of 11.87% sulfuric acid, corresponding to 0.99 mol of sulfuric acid per mol of KOH, were added at 80° C. to 1301.6 g of the product from Example 4, and stirring was carried out for one hour at 80° C. After addition of 0.883 g of Irganox® 1076, the product was dewatered for one hour at 18 mbar (water-jet vacuum) and then for 3 hours at 110° C. and 1 mbar. After filtration over a laboratory suction filter equipped with a T 750 deep-bed filter from Pall, a clear product was obtained.

The results of the tests are summarised in Table 1.

TABLE 1

| Example | Measured OH number [mg KOH/g] | Colour value | Appearance |
|---|---|---|---|
| 1A (comparison) | 626 | 157 Hazen | clear |
| 1B | 625 | 92 Hazen | clear |
| 2A (comparison) | 624 | 4.6 Gardner | clear |
| 2B | 624 | 1.8 Gardner | clear |
| 2C (comparison) | 624 | 3.6 Gardner | cloudy |
| 2D (comparison) | 624 | 2.6 Gardner | clear |
| 2E | 624 | 2.2 Gardner | clear |
| 3A (comparison) | 622 | 4.2 Gardner | clear |
| 3B | 620 | 3.3 Gardner | clear |
| 4A (comparison) | 470 | 3.3 Gardner | cloudy |
| 4B (comparison) | 470 | 1.8 Gardner | clear |
| 4C | 469 | 1.6 Gardner | clear |

The colour values were determined according to the specification of DIN 53995, and the OH numbers were determined according to the specification of DIN 53240.

The invention claimed is:

1. A process for the preparation of a polyol which comprises:
   providing an amino-group-containing starter compound;
   adding an alkylene oxide;
   adding a catalyst based on a compound selected from the group consisting of alkali metal hydroxides, alkali metal hydrides, alkaline earth metal hydrides, alkali metal carboxylates, alkaline earth metal carboxylates, and alkaline earth metal hydroxides, wherein the catalyst is present in an amount of from 0.004 to 0.1 wt. % based on the amount of polyol; and
   neutralizing the polyol with from 0.75 to 1 mol of sulfuric acid per mol of catalyst used.

2. The process according to claim 1, wherein the catalyst is added before the addition of the alkylene oxide.

3. The process according to claim 1, wherein the catalyst is added during the addition of the alkylene oxide.

4. The process according to claim 1, wherein the catalyst is added after the addition of the alkylene oxide.

5. The process according to claim 1, wherein the catalyst is at least one alkali metal hydroxide.

6. The process according to claim 5, wherein the catalyst is potassium hydroxide.

7. The process according to claim 1, wherein the catalyst is present in an amount of from 0.025 to 0.1 wt. % based on the amount of polyol.

8. The process according to claim 6, wherein the catalysts is present in an amount of from 0.025 to 0.1 wt. % based on the amount of polyol, and wherein the neutralization is carried out with from 0.95 to 1 mol of sulfuric acid per mol of catalyst used.

9. The process according to claim 1, wherein the neutralization is carried out with from 0.95 to 1 mol of sulfuric acid per mol of catalyst used.

10. The process according to claim 1, wherein salts formed during neutralization are not separated off.

11. The process according to claim 1, further comprising:
    adding water in the amount of from 2% to 20%, based on the polyol, before, during, and/or after the neutralization step;
    removing the water and salts formed during neutralization;
    separating off the salts after the water has been removed.

12. The process according to claim 1, further comprising adding triglycerides in the amount of from 10 to 80 wt. %, based on the amount of polyol, before or during the addition of the alkylene oxide.

13. The process according to claim 12, wherein the catalyst is present in an amount of from 0.025 to 0.1 wt. % based on the amount of polyol, and wherein the neutralization is carried out with from 0.95 to 1 mol of sulfuric acid per mol of catalyst used, and wherein salts formed during neutralization are not separated off.

14. A polyol obtained by the process according to claim 1.

15. A polyurethane prepared from the polyol according to claim 14.

\* \* \* \* \*

UNITED STATES PATENT AND TRADEMARK OFFICE
CERTIFICATE OF CORRECTION

PATENT NO.        : 8,501,904 B2                                                   Page 1 of 1
APPLICATION NO.   : 12/999362
DATED             : August 6, 2013
INVENTOR(S)       : Lorenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 168 days.

Signed and Sealed this

Fifteenth Day of September, 2015

Michelle K. Lee
*Director of the United States Patent and Trademark Office*